(12) United States Patent
Ohshita

(10) Patent No.: US 7,585,227 B2
(45) Date of Patent: Sep. 8, 2009

(54) JOINT BOOT

(75) Inventor: Takenori Ohshita, Osaka (JP)

(73) Assignee: Toyo Tire & Rubber Co., Ltd., Osaka-shi (JP)

( * ) Notice: Subject to any disclaimer, the term of this patent is extended or adjusted under 35 U.S.C. 154(b) by 855 days.

(21) Appl. No.: 11/110,836

(22) Filed: Apr. 21, 2005

(65) Prior Publication Data
US 2006/0107615 A1 May 25, 2006

(30) Foreign Application Priority Data
Oct. 19, 2004 (JP) ............... PCT/JP2004/015426
Mar. 9, 2005 (JP) ............... 2005-065545

(51) Int. Cl.
F16C 1/26 (2006.01)
F16D 3/84 (2006.01)
F16J 15/52 (2006.01)

(52) U.S. Cl. .................. 464/175; 277/636
(58) Field of Classification Search ........... 464/111, 464/173, 175, 905; 277/634–636
See application file for complete search history.

(56) References Cited

U.S. PATENT DOCUMENTS 4,280,340 A * 7/1981 Goguet ............... 464/124
4,320,632 A * 3/1982 Dore' ................. 464/111
2004/0056434 A1 * 3/2004 Wolf et al. ............ 277/634

FOREIGN PATENT DOCUMENTS

| EP | 0 915 264 A2 | 5/1999 |
| FR | 2 833 665 | 6/2003 |
| FR | 2 838 487 | 10/2003 |
| FR | 2838487 A1 * | 10/2003 |
| JP | 2003-329057 | 11/2003 |

* cited by examiner

Primary Examiner—Greg Binda
Assistant Examiner—Clifford J Louden
(74) Attorney, Agent, or Firm—Westerman, Hattori, Daniels & Adrian, LLP.

(57) ABSTRACT

In a joint boot to be mounted on an outer housing having a non-circular outer peripheral configuration, the invention is designed for ensuring a high sealing capability without impairing the moldability. To that end, its large-diameter attachment part to be attached to the outer housing is configured, in its internal peripheral contour, to bulge radially inwardly in plural circumferential places thereof so that bulging portions each include an inner wall portion radially inwardly bulging in a curved form, an arc-like outer wall portion constituting part of an outer peripheral face of the large-diameter attachment part, a radially extending central strut wall linking these inner and outer wall portions in peripheral centers of both, and lateral strut walls linking on both sides of the central strut wall the inner and outer wall portions. The lateral strut walls are slanted such that their outward parts approach the central strut wall.

8 Claims, 4 Drawing Sheets

RELATED ART  *FIG. 7*
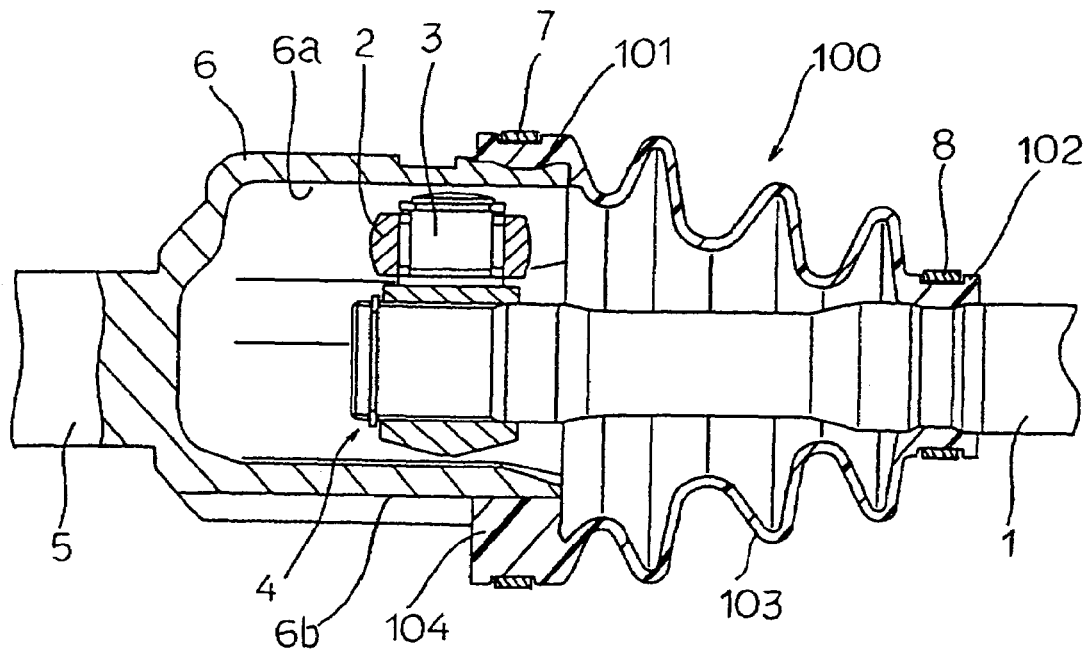
RELATED ART  *FIG. 8*
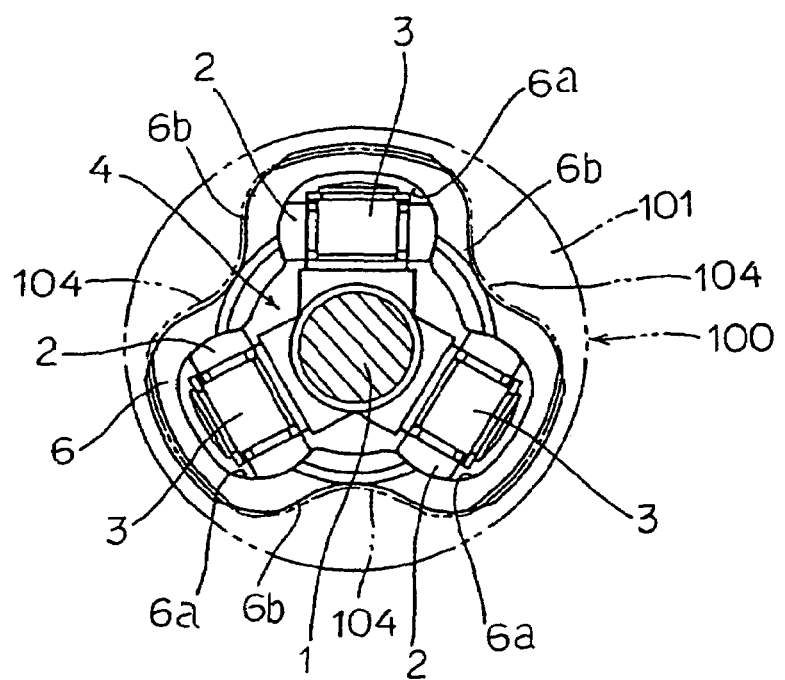

JOINT BOOT

BACKGROUND OF THE INVENTION

1. Field of the Invention

This invention relates to a bellows-shaped joint boot mainly used for tripod type constant velocity joints or the like of automobiles.

2. Description of Related Art

As one of constant velocity joints for use in a driveshaft, etc. of vehicles, a tripod type joint is well known.

A tripod type constant velocity joint is, as shown in FIGS. 7, 8 by way of example, comprised of a tripod 4 wherein three trunnions 3 having respective rollers 2 are provided at the one shaft 1 of input and output side shafts in a manner projecting in a normal direction to the axis thereof, and an outer housing 6 provided at an end of the other shaft 5. The outer housing 6 has on its inner periphery three axial grooves 6a for sliding corresponding to the tripod 4. The constant velocity joint is constructed so that the rollers 2 of the tripod 4 are fitted to be axially slidable in the sliding grooves 6a, thereby enabling the transmission of running torque while enabling the angulation of both shafts 1, 5.

In such constant velocity joints, in order to prevent the ingress of dust and extraneous substances into the joint or to retain the grease sealed therein, it is a common practice to equip a bellows-shaped joint boot 100 capable of appropriate expansion and contraction and bending deformation so as to cover the shaft 1 on the tripod 4 side from the outer housing 6. The joint boot 100 is constructed so that its axially one end is formed as a large-diameter attachment part 101 which is fitted in the outer periphery of the outer housing 6 and fixed by means of a tightening member 7 such as a ring-like band and its other end is formed as a small-diameter attachment part 102 which is fixed on the outer periphery of the shaft 1 on the tripod 4 side by means of a tightening member 8 such as ring-like band, and the both 101, 102 are integrally joined by a bellows part 103.

As shown in FIG. 8, the outer housing 6 is provided, on its external periphery, with three circumferentially equidistantly disposed recessed portions 6b, corresponding to the disposition of the sliding grooves 6a on its internal periphery and hence, the external peripheral contour of the outer housing 6 is of a non-circular shape assuming a circumferentially sinusoidal (salient and reentrant) form. Because of that, the large-diameter attachment part 101 of the joint boot to be attached to the outer housing 6 has an internal peripheral contour assuming a non-circular shape conforming to the external peripheral contour of the outer housing 6. Stated another way, the internal periphery of the large-diameter attachment part 101 is formed to bulge inwardly in a raised fashion in circumferentially three places thereof, corresponding to the recessed portions 6b of the outer housing 6.

Where such inwardly bulging portions 104 of the large-diameter attachment part 101 are formed as solid thick-walled portions as illustrated in FIG. 7, the thick-walled portions and thin-walled portions are formed alternately in the circumferential direction of the large-diameter attachment part 101, and consequently, a problem arose in that sufficient sealing properties to the outer housing 6 were difficult to ensure. To solve such problems as this, Patent Reference 1 listed below discloses an example, wherein the inwardly bulging portions of the large-diameter attachment part are constructed each of an inner wall portion jutting inwardly in a curved form, an outer wall portion in an arc form on the outer periphery side, and a plurality of strut walls linking the inner wall portion and outer wall portion, the strut walls being disposed equidistantly in the circumferential direction and extending parallel with one another. Another example is disclosed in Patent Reference 2 listed below, wherein the inner wall portion and the outer wall portion are linked by a single strut wall in circumferential centers of both.

[Patent Reference 1] EP 0 915 264A2, A3
[Patent Reference 2] JP-A-2003-329057

Where the inner wall portion and the outer wall portion are linked by a plurality of mutually parallel strut walls disposed equidistantly, as is the technology disclosed in the foregoing Patent Reference 1, in the circumferentially central part of the bulging portion, it is possible to ensure a large cross-sectional area of relief holes, which are a hollow part formed between two strut walls, whereas in circumferential ends of the bulging portion, the cross-sectional area of relief holes is smaller. For that reason, cores for molding such small relief holes are difficult to demold, so that the problem is encountered that the moldability is impaired.

On the other hand, where the inner wall portion and the outer wall portion are linked by a single strut wall in the circumferential centers of both, as is the technology disclosed in Patent Reference 2 above, the moldability is good, but there is still the problem that the contact pressure the inner wall portions exert on the outer housing when tightening and fixing the large-diameter attachment part is difficult to be equalized in the circumferential direction.

SUMMARY OF THE INVENTION

In view of these issues, this invention has been made and is aimed at providing a joint boot designed to be attached to an outer housing in the form of a non-circular outer peripheral contour as in a tripod type constant velocity joint, and more particularly, such a joint boot that it is possible to equalize the contact pressure its inner wall portions exert on the outer housing upon tightening and fixing to the outer housing without impairing the moldability and accordingly, to ensure a high sealing capability.

The joint boot relating to this invention comprises a large-diameter attachment part to be attached to an outer housing that assumes an external peripheral configuration having a plurality of recessed portions in the circumferential direction thereof, a small-diameter attachment part to be attached to a shaft, and a bellows part integrally joining both, wherein the large-diameter attachment part has an external peripheral contour assuming a circular shape and an internal peripheral contour assuming radially inwardly bulging portions in a plurality of circumferential places thereof; and wherein at each of the bulging portions, the large-diameter attachment part includes an inner wall portion bulging radially inwardly in a curved form, an arc-shaped outer wall portion constituting part of the outer peripheral face of the large-diameter attachment part, a central strut wall joining the inner wall portion and the outer wall portion in peripherally central parts of both, and lateral strut walls joining the inner wall portion and the outer wall portion at both sides of the central strut wall, the lateral strut walls slanting in such a manner that as they extend outwardly, they approach the central strut wall.

According to the bulging portions having such construction as this, hollow parts as a relief hole are defined between the central strut wall and the lateral strut walls and on both sides of the lateral strut walls and hence, it is possible to prevent the production of sink marks attributed to the shrinkage after molding as compared with the case where the bulging portions are formed of a solid thick-walled part, and accordingly, to improve the moldability and sealing capability.

In particular, according to this invention, on account of the fact that the lateral strut walls are provided to slant in such a manner that their outward parts approach the central strut wall, the following effects accrue: That is, in the case where the lateral strut walls are disposed in parallel with the central strut wall, the relief holes outside the lateral walls are smaller and cores for them are difficult to demold. However, by slanting the lateral strut walls toward the central strut wall as described above, the cross-sectional area of the relief holes located outside the lateral strut walls is ensured, whereby the demolding properties of the cores can be ensured.

Further in accordance with this invention, due to the slanting of the lateral strut walls in the manner described above, it is possible to link the lateral strut walls supporting the outside face of the inner wall portion relative to the inner wall portion at a nearly vertical angle. As a consequence, when the large-diameter attachment part is clamped and fixed, it is possible to equalize the contact pressure the inner wall portions impose on the outer housing, and to elevate the sealing properties at the bulging portions. From this viewpoint, it is preferred that the lateral strut walls be joined to the inner wall portion nearly vertically, and more particularly, the angle of the lateral strut walls to the inner wall portion is preferred to be in the range of 70 to 110 degrees.

In the joint boot of this invention, it is preferred that the lateral strut walls be linked to the inner wall portion in the intermediate position between a linking part (juncture) at the inner wall portion to the central strut wall and a foot part at the inner wall portion to the outer wall portion. Seeing that a weakest part on both sides of the linking part of the inner wall portion to the central strut wall is the intermediate point between the linking part and the foot part to the outer wall portion, it is more effective for equalization of the contact pressure on the outer housing by the inner wall portions that the inner wall portion should be reinforced in this position so as to be supported by the lateral strut walls.

In the joint boot of this invention, it is also possible to construct so that a center line in the thickness direction of one of the lateral strut walls, a center line in the thickness direction of the other of the lateral strut walls, and a center line in the thickness direction of the central strut wall intersect at one point, and this intersection point is situated radially outwardly of the outer peripheral face of the large-diameter attachment part. When being formed so that the intersection point of the center lines of the lateral strut walls at the right and left hands and the center line of the central strut wall is situated outwardly of the outer peripheral face of the large-diameter attachment part in this manner, the lateral strut walls will be joined to the outer wall portion in a position circumferentially spaced apart from the joining part of the central strut wall to the outer wall portion. Because of that, it is possible to get around the fact that the central strut wall and the lateral strut walls are joined at one point in the middle area of the outer wall portion, which results in a large wall thickness in the aforementioned middle area, and hence it is possible to more effectively prevent the production of sink marks.

In the joint boot of this invention, at each of the bulging portions, four relief holes divided by the central strut wall and the pair of lateral strut walls may be juxtaposed in the circumferential direction and formed in a manner subsiding in the axial direction from the opening edge face of the large-diameter attachment part. By such formation of the relief holes subsiding from the opening edge face of the large-diameter attachment part, upon molding of the large-diameter attachment part, cores for shaping the relief holes are easy to demold without being obstructed by the bellows part, and the moldability is thus superior.

According to this invention, in the joint boot to be attached to an outer housing of a non-circular outer peripheral configuration as is the case with tripod type constant velocity joints, it is possible to equalize the contact pressure the bulging portions exert on the outer housing when the joint boot is tightened and secured in the circumferential direction without impairing the modability, thereby ensuring a high sealing capability.

BRIEF DESCRIPTION OF THE DRAWINGS

FIG. 7 is a sectional view showing a tripod type constant velocity joint equipped with a conventional resin joint boot.

FIG. 8 is a side elevation of the previous constant velocity joint.

DESCRIPTION OF REFERENCE CHARACTERS

10 . . . resin joint boot, 12 . . . small-diameter attachment part, 14, 14a . . . large-diameter attachment part, 16 . . . bellows part, 24 . . . bulging portion, 26 . . . inner wall portion, 26a . . . foot part of the inner wall portion to the outer wall portion, 26b . . . linking part of the inner wall portion to the central strut wall, 28 . . . outer wall portion, 30 . . . central strut wall, 32 . . . lateral strut wall

BEST MODE FOR CARRYING OUT THE INVENTION

Embodiments for carrying the invention into effect will be described with reference to the accompanying drawings.

Figure 1:
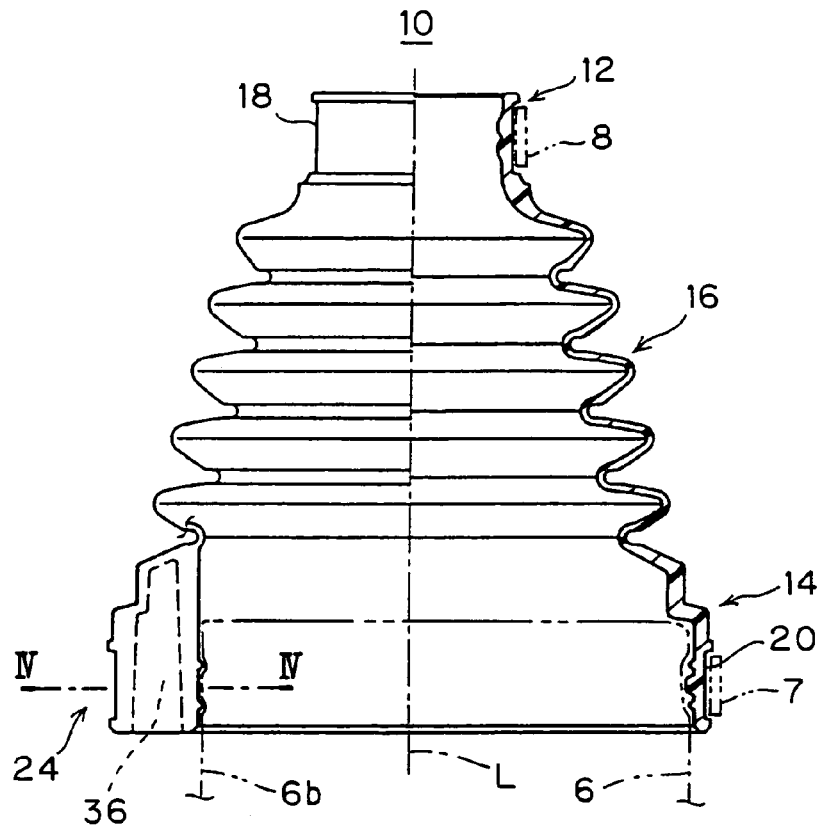
FIG. 1 is a half sectional, half side elevational view of a joint boot made of resin pertaining to one embodiment of this invention.
Figure 2:
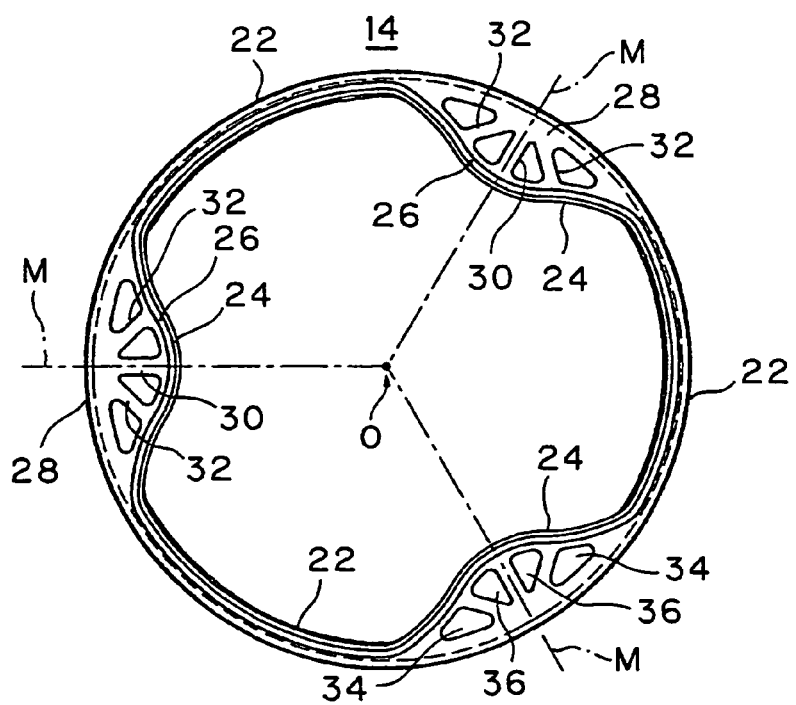
FIG. 2 is a front elevation of the joint boot above when viewed from its large-diameter attachment part side.

FIG. 1 is a half sectional, half side elevational view of a joint boot 10 relating to one embodiment of this invention, and FIG. 2 is a front elevation of its large-diameter side. The joint boot 10 is a boot made of thermoplastic elastomer resin destined to be mounted on a tripod type constant velocity joint for automobiles illustrated in FIGS. 7 and 8 as stated above. The joint boot 10 includes a small-diameter attachment part 12 at its one end, a large-diameter attachment part 14 at the other end disposed coaxially with the small-diameter attachment part 12 to be spaced apart from it, and a bellows part 16 of a hollow form integrally joining the small-diameter attachment part 12 and the large-diameter attachment part 14, and is fabricated integrally by a conventional molding method such as injection blow molding.

The small-diameter attachment part 12 assumes the shape of a short cylinder to be externally fitted and secured to the shaft 1 on the tripod 4 side and is provided on its outer peripheral face with a circumferentially extending depression 18 for fixation for receiving the ring-like clamping member 8.

The large-diameter attachment part 14 assumes the shape of a short cylinder to be externally fitted and secured to the outer housing 6 and is disposed coaxially with the small-diameter attachment part 12, namely so as to have a common center line L. The large-diameter attachment part 14 is provided, on its outer peripheral face, also with a circumferentially extending depression 20 for fixation for receiving the ring-like clamping member 7.

The bellows part 16 is of a bellows body in a circular form in cross-section having an aperture diameter difference between both ends, and defines internally a space for containment of grease. The bellows part 16 is configured in a tapered form tapering progressively from the large-diameter attachment part 14 down to the small-diameter attachment part 12.

As illustrated in FIG. 2, the large-diameter attachment part 14 assumes a circular shape in external peripheral contour. On the other hand, in its internal peripheral contour, the large-diameter attachment part 14 assumes a non-circular shape that bulges inwardly in the form of a curved plane in a plurality of circumferential places (three places in this embodiment) according as the external peripheral configuration of the outer housing 6 that a plurality of (three in this embodiment) the recessed portions 6b are disposed equidistantly in the circumferential direction. Thereby the large-diameter attachment part 14 consists of arc-like portions 22 to be disposed on arc-like outer peripheral faces of the outer housing 6 and bulging portions 24 to be fitted in the recessed portions 6b of the outer housing 6, both arranged alternately in the circumferential direction.

The bulging portions 24 each include an inner wall portion 26 bulging inwardly, and an outer wall portion 28 assuming an arc form on the outer periphery side. And in the hollow part between the inner wall portion 26 and the outer wall portion 28, there are provided a central strut wall 30 linking both wall portion 26, 28 in peripheral middles of both, and a pair of lateral strut walls 32, 32 linking both wall portions 26, 28 at both right and left hands of the former.

The outer wall portions 28 are an arc-shaped wall part having a circumferentially nearly constant wall thickness and each have a wall thickness approximately the same as that of the arc-like portions 22 so that the outer wall portions constitute a single cylinder body together with the arc-like portions 22. The inner wall portions 26 are configured to protrude in a curved plane form radially inwardly from the inner peripheral face of this cylinder body, and formed in nearly the same wall thickness as that of the outer wall portions 28 and in a nearly constant wall thickness in the circumferential direction.

Figure 4:
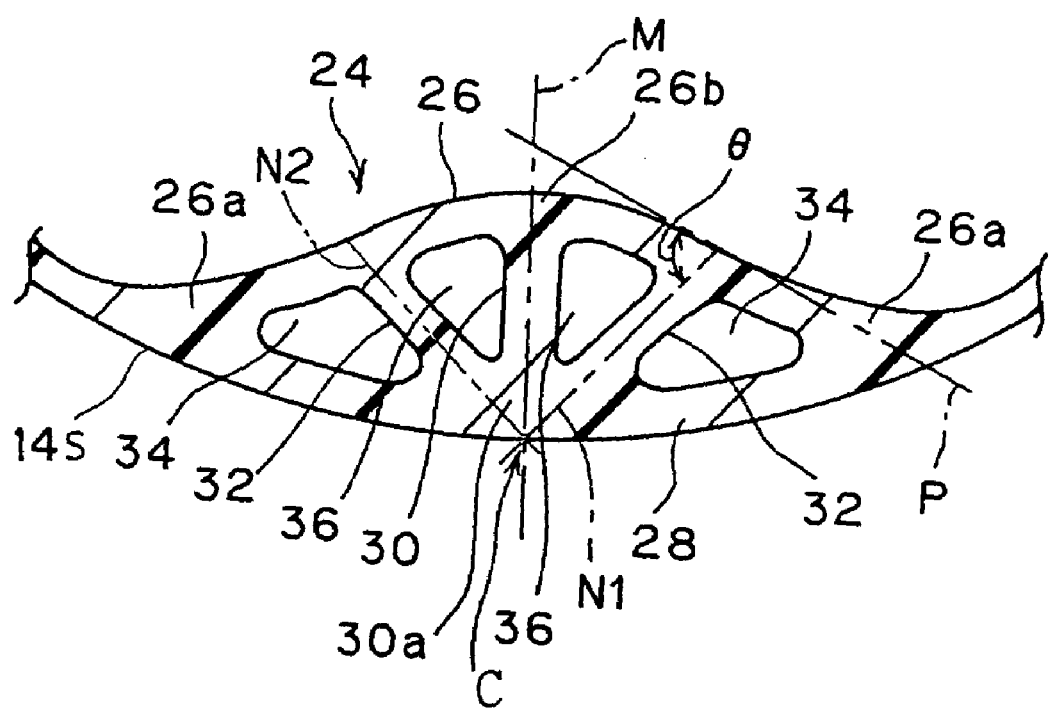
FIG. 4 is a sectional view taken along IV-IV line of FIG. 1.

As shown in FIG. 4, the central strut wall 30 is a wall extending in the radial direction and supporting the inner wall portion 26 to the outer wall portion 28, and formed in nearly the same wall thickness as that of the inner wall portion 26. The central strut wall 30 is provided in the peripheral center of the inner wall portion 26, which is the largest in its inwardly protruding height The lateral strut wall 32 is a wall part supporting the inner wall portion 26 to the outer wall portion 28 and formed in nearly the same wall thickness as that of the inner wall portion 26. The lateral strut walls 32 are formed not in parallel with the central strut wall 30 provided in a radial fashion from a center O of the large-diameter attachment part 14, but in a slanting manner such that outward parts thereof may approach the central strut wall 30. Thereby three strut walls in total consisting of the lateral strut walls 32, 32 on the right and left sides and the central strut wall 30 extend, centering a joining part 30a of the central strut wall 30 to the outer wall portion 28, namely a circumferential middle of the outer wall portion 28, from there toward the inner wall portion 26 in a radial fashion. More particularly, in this embodiment, a center line N1 in the thickness direction of the one lateral strut wall 32, a center line N2 in the thickness direction of the other lateral strut wall 32, and a center line M in the thickness direction of the central strut wall 30 intersect at a point C on an outer peripheral face 14s of the large-diameter attachment part 14 at the joining part 30a.

Further, the lateral strut wall 32 supports the inner wall portion 26 in the intermediate position between a foot part 26a at the inner wall portion 26 to the outer wall portion and a linking part 26b at the inner wall portion 26 to the central strut wall 30 so that the inner wall portion 26 may be supported by the central strut wall 30 and the lateral strut walls 32, 32 equidistantly in the circumferential direction, namely the lateral strut wall is linked to the inner wall portion 26 in the aforesaid intermediate position. Further the lateral strut wall is provided to slant so as to intersect to the inner wall portion 26 nearly vertically at this linking part 26b in such a manner that as it extends outwardly from the linking part, it approaches the center, namely approaches the central strut wall 30. Here, the joining angle theta ($\theta$) of the lateral strut wall 32 to the inner wall portion 26 is preferred to be approximately vertical, and more particularly, the joining angle $\theta$ is preferably in the range of 70 degrees to 110 degrees (i.e. 90°±20°), more preferably in the range of 80 degrees to 100 degrees. If the joining angle $\theta$ is smaller than 70 degrees or larger than 110 degrees, it will be difficult to make the contact pressure the inner wall portions 26 exert on the outer housing 6 uniform in the circumferential direction. By the joining angle $\theta$ is meant an angle at which the center lines N1, N2 of the lateral strut walls 32 and tangential lines P at the inner peripheral face of the inner wall portion 26 intersecting to the center lines N1, N2 make.

Figure 3:
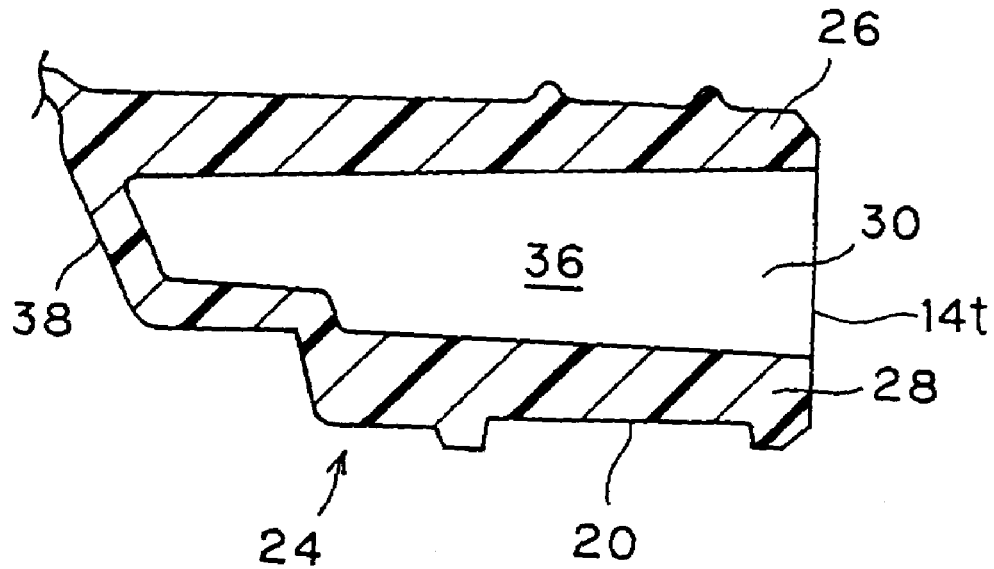
FIG. 3 is an enlarged sectional view of essential parts of the joint boot above.

By constructing in this manner, at each of the bulging portions 24 there are provided a plurality of (four in this embodiment) relief holes 34, 36, 36, 34 as a hollow part juxtaposing in the circumferential direction. These relief holes 34, 36, 36, 34 are provided in a lateral symmetry relative to a circumferentially middle line (namely, a center line M of the central strut wall 30) of the bulging portion 24, and as shown in FIG. 3, formed to subside in the axial direction of the boot 10 from the opening edge face 14t (opposite edge face to the bellows part 16) of the large-diameter attachment part 14. And a pair of the relief holes 36, 36 located inwards when divided by the central strut wall 30 assume a triangular shape in cross-section having an apex angle directed radially outwardly whereas a pair of the relief holes 34, 34 located outwards assumes a triangular shape in cross-section having a radially inwardly directed apex angle. The relief holes 34, 36, 36, 34 extend in the entire axial direction of the bulging portion 24 in this embodiment as illustrated in FIG. 3, whereby the wall thicknesses of respective portions at the bulging portion 24 inclusive of a longitudinal wall portion 38 constituting the bottom wall of the relief hole are made thin, thus preventing the production of sink marks ascribed to shrinkage after molding.

According to the joint boot 10 in this embodiment as constructed above, because the relief holes 34, 36, 36, 34 are provided each at the bulging portion 24 of the large-diameter attachment part 14, it is possible to prevent the production of sink marks attributed to shrinkage after molding as compared with the case where the bulging portions are formed of a solid thick-walled portion.

In the case where the lateral strut walls 32 are disposed parallel with the central strut wall 30, the relief holes 34 located outwards of the lateral strut walls 32 are smaller, so that cores for molding the relief holes 34 are difficult to demold. However, because the lateral strut walls are slanted toward the central strut wall 30 side as described above, thereby the cross-sectional area of the aforesaid outward relief holes 34 can be made the same level as that of the inward relief holes 36 and hence, demolding properties of cores for molding these both relief holes can be ensured to enhance the moldability. Besides, it is possible to suppress the deformation of the cores to injection pressure of a resin upon molding, thereby to elevate the durability.

By slanting the lateral strut walls 32 in the manner as described above, it is further possible to link the lateral strut walls 32 supporting the outside face of the inner wall portion 26 to the inner wall portion 26 at a nearly vertical angle. As a consequence, when clamping and fixing the large-diameter attachment part 14 by use of a clamping member 17, it is possible to equalize the contact pressure the inner walls 26 exert on the outer housing 6 in the circumferential direction, thereby elevating the sealing properties at the bulging portions 24.

Figure 5:
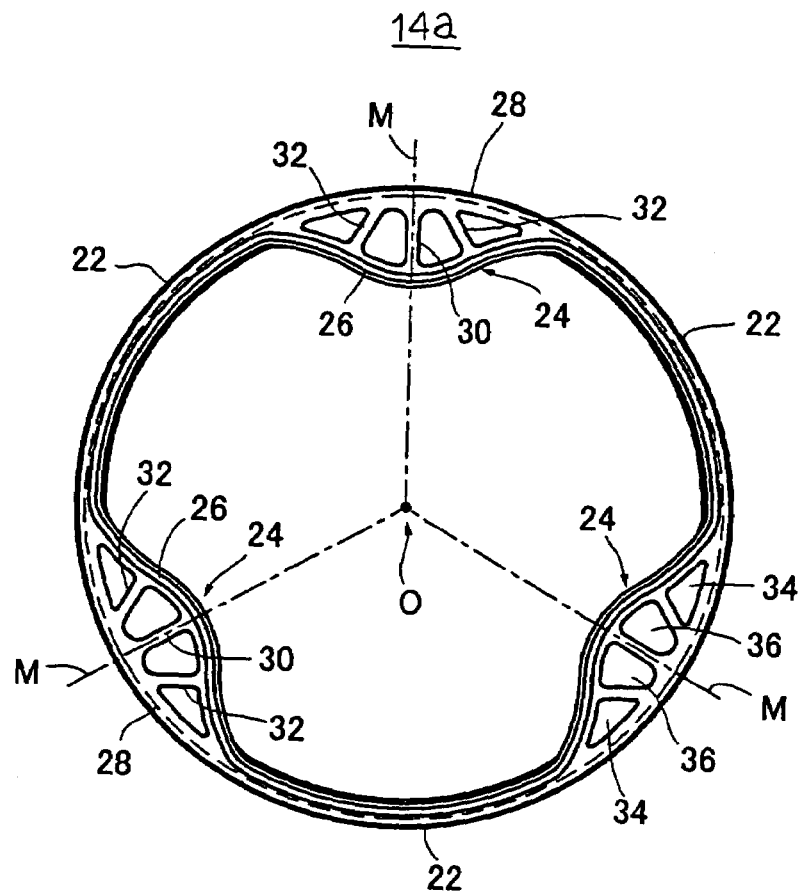
FIG. 5 is a front elevation of a resin joint boot pertaining to another embodiment when viewed from its large-diameter attachment part side.
Figure 6:
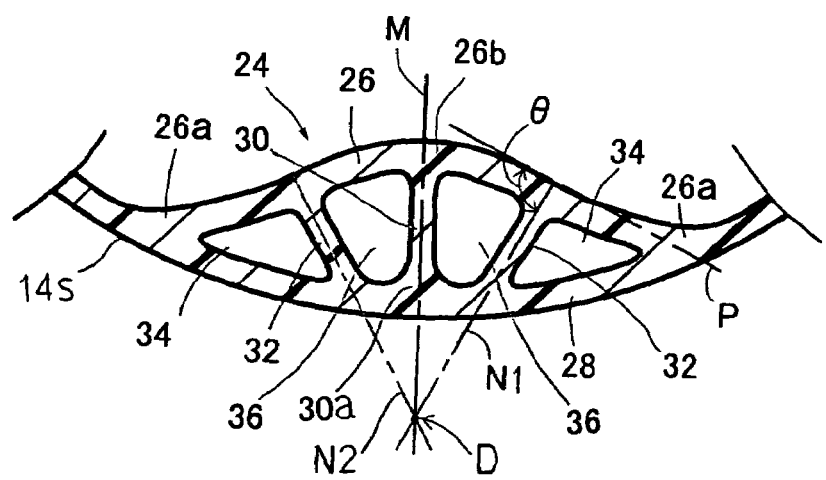
FIG. 6 is an enlarged sectional view of essential parts of the joint boot in FIG. 5.

FIG. 5 is a front elevation of the joint boot pertaining to another embodiment when viewed from the side of a large-diameter attachment part 14a and FIG. 6 is an enlarged sectional view of essential parts of FIG. 5. This embodiment is different from the previous embodiment described above in respect of the construction of the lateral strut walls 32, 32 at the bulging portions 24 of the large-diameter attachment part 14a.

More specifically, in this embodiment as illustrated in FIG. 6 to an enlarged scale, the center line N1 in the thickness direction of the one lateral strut wall 32 and the center line N2 in the thickness direction of the other lateral strut wall 32 intersect at one intersection point D relative to the center line M in the thickness direction of the central strut wall 30, and the intersection point D is situated radially outwardly of the outer peripheral face 14s of the large-diameter attachment part 14a. And thereby the lateral strut walls 32, 32 are joined to the outer wall portion 28 not at the joining part 30a of the central strut wall 30 to the outer wall portion 28, but to the outer wall portion 28 in its circumferentially spaced positions from the joining part 30a. Further in this embodiment, the joining angle θ of the lateral strut wall 32 to the inner wall portion 26 is set at an angle closer to 90 degrees than in the foregoing embodiment.

Being constructed in this manner, this embodiment is different from the foregoing embodiment in cross-sectional shape of a pair of the relief holes 36, 36 located inwards and divided by the central strut wall 30, of the four relief holes 34, 36, 36, 34 provided at the bulging portion 24. That is, in this embodiment, the inward pair of the relief holes 36, 36 assume such a trapezoid shape in cross-section that the outer peripheral face side of the large-diameter attachment part 14a is narrowed. The outward pair of the relief holes 34, 34 assume a triangular shape in cross-section similarly to the foregoing embodiment.

The other constitution than them is similar to the constitution in the foregoing embodiment, and consequently, similar useful effects to those in the foregoing embodiment are achieved also in this embodiment. In particular, in this embodiment, because the lateral strut walls 32, 32 at right and left hands are joined to the outer wall portion 28 in a position spaced apart a predetermined distance from the joining part 30a of the central strut wall 30 to the outer wall portion 28, it is possible to make the wall thickness in the central area of the outer wall portion 28 thin, and consequently, to prevent more effectively the production of sink marks after molding. Further, because the joining angle θ of the lateral strut wall 32 to the inner wall portion 26 is set at an angle closer to 90 degrees than in the foregoing embodiment, it is possible to equalize more the contact pressure at the inner wall portions 26 upon clamping and fixing of the large-diameter attachment part 14 and to enhance the sealing properties at the bulging portions 24.

The joint boot of this invention is capable of ensuring a high sealing capability without impairing the moldability and hence, can be utilized suitably as a joint boot mainly used for tripod type constant velocity joints of automobiles.

The invention claimed is:

1. A joint boot, comprising:
   a large-diameter attachment part to be attached to an outer peripheral contour of an outer housing, said outer peripheral contour having a plurality of recessed portions in the circumferential direction thereof,
   a small-diameter attachment part to be attached to a shaft, and
   a bellows part integrally joining said large-diameter attachment part and said small-diameter attachment part,
   wherein an external peripheral configuration of said large diameter part is a circular shape,
   wherein an internal peripheral configuration of said large diameter part bulges radially inwardly at a plurality of circumferential places thereof to form bulging portions;
   wherein at each of said bulging portions, the large-diameter attachment part comprises:
      an inner wall portion bulging radially inwardly in a curved form,
      an arc-like outer wall portion constituting part of an outer peripheral face of the large-diameter attachment part,
      a radially extending central strut wall linking the inner wall portion and the outer wall portion in peripheral middles of said inner wall portion and said outer wall portion, and
      lateral strut walls linking, on both sides of the central strut wall, the inner wall portion and the outer wall portion, the lateral strut walls slanting such that as the lateral strut walls extend radially outwards, the lateral strut walls approach the central strut wall,
   wherein said large diameter part further comprises longitudinal wall portions on a bellows part side of each of said bulging portions, so as to form a plurality of relief holes open in a direction away from said small-diameter part, and
   wherein a center line of a first lateral strut wall in its thickness direction, a center line of a second lateral strut wall in its thickness direction, and a center line of the central strut wall in its thickness direction intersect at an intersection point, and the intersection point is situated radially outwardly of an outer peripheral face of said large-diameter attachment part.

2. The joint boot as set forth in claim 1, wherein said lateral strut walls are linked to the inner wall portion at an intermediate position between a linking part, which joins the inner wall portion to the central strut wall, and a foot part, which joins the inner wall portion to the outer wall portion.

3. The joint boot as set forth in claim 1, wherein each of the lateral strut walls is linked to the outer wall portion at a position circumferentially spaced apart from the joining part of the central strut wall to the outer wall portion.

4. The joint boot as set forth in claim 1, wherein the lateral strut walls are linked to the inner wall portion nearly vertically.

5. The joint boot as set forth in claim 1, wherein an angle of said lateral strut walls relative to the inner wall portion is in the range of 70 degrees to 110 degrees.

6. The joint boot as set forth in claim 1, wherein each of the bulging portions comprises a hollow part divided into four relief holes by the central strut wall and the pair of the lateral strut walls in a circumferentially juxtaposed manner, and the relief holes are formed to axially subside from an opening edge face of the large-diameter attachment part.

7. The joint boot as set forth in claim 6, wherein said four relief holes comprise:

a pair of inward relief holes divided by the central strut wall which are a triangular shape in cross-section, and have an apex angle directed radially outwardly, and a pair of outward relief holes which are a triangular shape in cross-section, and have an apex angle directed radially inwardly.

8. The joint boot as set forth in claim 6, wherein said four relief holes comprise:

a pair of inward relief holes divided by the central strut wall which are a trapezoid shape in cross-section, and narrow radially outwardly, and a pair of outward relief holes which are a triangular shape in cross-section, and have an apex angle directed radially inwardly.

* * * * *

UNITED STATES PATENT AND TRADEMARK OFFICE
CERTIFICATE OF CORRECTION

PATENT NO.      : 7,585,227 B2
APPLICATION NO. : 11/110836
DATED           : September 8, 2009
INVENTOR(S)     : Takenori Ohshita It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1175 days.

Signed and Sealed this

Fourteenth Day of September, 2010

David J. Kappos
*Director of the United States Patent and Trademark Office*